US012634078B2

(12) United States Patent (10) Patent No.: US 12,634,078 B2
Li et al. (45) Date of Patent: May 19, 2026

(54) CHANNEL STATE INFORMATION TRANSMISSION METHOD AND DEVICE, COMMUNICATION NODE, AND STORAGE MEDIUM

(71) Applicant: ZTE CORPORATION, Shenzhen (CN)

(72) Inventors: Yong Li, Shenzhen (CN); Hao Wu, Shenzhen (CN); Zhaohua Lu, Shenzhen (CN); Yuxin Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 310 days.

(21) Appl. No.: 18/559,125

(22) PCT Filed: Apr. 28, 2022

(86) PCT No.: PCT/CN2022/089804
§ 371 (c)(1),
(2) Date: Nov. 6, 2023

(87) PCT Pub. No.: WO2022/242444
PCT Pub. Date: Nov. 24, 2022

(65) Prior Publication Data
US 2024/0243867 A1 Jul. 18, 2024

(30) Foreign Application Priority Data
May 19, 2021 (CN) .......................... 202110548009.6

(51) Int. Cl.
*H04L 5/00* (2006.01)
(52) U.S. Cl.
CPC .......... *H04L 5/0048* (2013.01); *H04L 5/0057* (2013.01)

(58) Field of Classification Search
CPC ........................... H04L 5/0048; H04L 5/0057
(Continued)

(56) References Cited

U.S. PATENT DOCUMENTS

2019/0363760 A1 11/2019 Wu et al.
2022/0159596 A1* 5/2022 Kim ......................... H04J 11/00
(Continued)

FOREIGN PATENT DOCUMENTS

CN 111082839 A 4/2020
CN 112865843 5/2021
(Continued)

OTHER PUBLICATIONS

Korean office action issued in KR Patent Application No. 10-2023-7041210, dated Jul. 30, 2025, 12 pages. English translation included.
(Continued)

*Primary Examiner* — Faisal Choudhury
(74) *Attorney, Agent, or Firm* — Perkins Coie LLP

(57) ABSTRACT

A channel state information transmission method, applied to a first communication node, is provided. The method includes: receiving configuration information of a second communication node; receiving a channel state information reference signal sent by the second communication node, according to the configuration information; and reporting channel state information according to the configuration information, wherein the channel state information is determined according to the channel state information reference signal; wherein the configuration information includes configuration information of the channel state information.

8 Claims, 2 Drawing Sheets

(58) Field of Classification Search
USPC ........................................................ 370/329
See application file for complete search history.

(56)                    References Cited

U.S. PATENT DOCUMENTS

| | | |
|---|---|---|
| 2022/0303812 A1 | 9/2022 | Chung et al. |
| 2023/0029296 A1 | 1/2023 | Li et al. |
| 2023/0179279 A1* | 6/2023 | Huang ................. H04B 7/0626 |
| | | 370/252 |
| 2024/0243867 A1 | 7/2024 | Li et al. |
| 2024/0267094 A1 | 8/2024 | Zheng et al. |

FOREIGN PATENT DOCUMENTS

| | | |
|---|---|---|
| WO | WO 2020/052736 | 3/2020 |
| WO | WO2020/220371 A1 | 11/2020 |
| WO | 2021029701 A1 | 2/2021 |
| WO | WO 2021/068915 | 4/2021 |

OTHER PUBLICATIONS

Lenovo et al., "CSI enhancements for multi-TRP and FDD reciprocity," 3GPP TSG RAN WG1 #105-e, R1-2105762, e-Meeting, May 10-27, 2021, 18 pages.

3GPP TSG RAN WG1 Meeting #104b-e, "RAN1 Chair's Notes", e-Meeting, Apr. 12-20, 2021, 128 pages.
Futurewei "CSI enhancement for multi-TRP and FDD", 3GPP TSG RAN WG1 Meeting #103-e, Agenda Item 8.1.4, e-Meeting, Oct. 26-Nov. 13, 2020, 8 pages.
PCT International Search Report and Written Opinion (with English translations) for corresponding PCT Application No. PCT/CN2022/089804, mailed Jul. 15, 2022, 14 pages.
3GPP TS 38.214 V16.5.0 (Mar. 2021), Technical Specification, 3rd Generation Partnership Project; Technical Specification Group Radio Access Network; NR; Physical layer procedures for data (Release 16), 171 pages.
Japanese Office Action (w/ English translation) for corresponding Application No. 2023-570419, mailed Dec. 3, 2024, 15 pages.
Partial European Search Report for corresponding Application No. EP 22803768.5, issued Oct. 4, 2024. 21 pages.
3GPP TSG RAN WG1#105-e, "On Rel-16 multi-beam maintenance", Samsung, e-Meeting, May 10-27, 2021, 4 pages.
3GPP TSG RAN WG1#105-e, "Views on Rel-17 CSI enhancements", Samsung, e-Meeting, May 10-27, 2021, 25 pages.
Extended European Search Report for corresponding Application No. 22803768.5, dated Feb. 7, 2025, 23 pages.
Japanese Office Action (w/ Machine Translation) for corresponding Application No. 2023-570419, dated May 7, 2025, 14 pages.

* cited by examiner

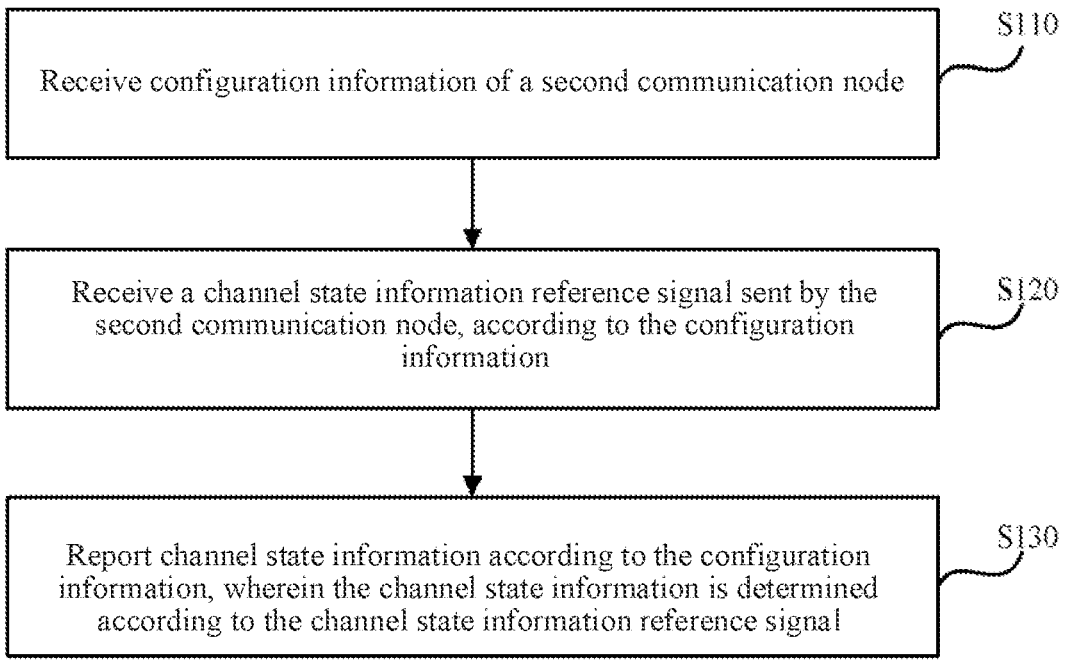

Receive configuration information of a second communication node          S110

Receive a channel state information reference signal sent by the second communication node, according to the configuration information          S120

Report channel state information according to the configuration information, wherein the channel state information is determined according to the channel state information reference signal          S130

FIG. 1

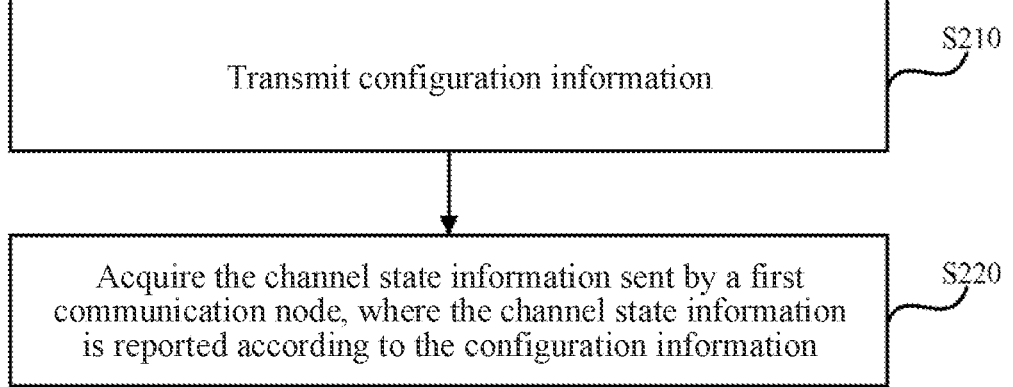

Transmit configuration information          S210

Acquire the channel state information sent by a first communication node, where the channel state information is reported according to the configuration information          S220

FIG. 2

CHANNEL STATE INFORMATION TRANSMISSION METHOD AND DEVICE, COMMUNICATION NODE, AND STORAGE MEDIUM

CROSS-REFERENCE TO RELATED APPLICATION(S)

This application is a national phase entry under 35 USC 371 of International Patent Application No. PCT/CN2022/089804 filed on Apr. 28, 2022, the International Patent Application is filed based on Chinese Patent Application with the application No. 202110548009.6, filed on May 19, 2021, and claims priority to the Chinese Patent Application, the entire contents of the International Patent Application and the Chinese Patent Application are incorporated herein by reference.

TECHNICAL FIELD

The present disclosure relates to the field of communication technology, and for example, relates to a channel state information transmission method and apparatus, a communication node, and a storage medium.

BACKGROUND

A transmission strategy of data transmission of a base station in a wireless communication system depends on channel state information. The base station determines a strategy of data transmission based on channel state represented by received channel state information, and transmits data, thereby improving the efficiency of data transmission. Herein, on one hand, the precision of the channel state represented by the channel state information affects the transmission strategy of the base station, thereby affecting the efficiency of data transmission. On the other hand, resources for feeding back the channel state information are limited, and thus, the feedback overhead needs to be saved.

Therefore, at present, the technical problem of how to save feedback overhead and improve the precision of channel state represented by channel state information is to be solved urgently.

SUMMARY

The present disclosure provides a channel state information transmission method and apparatus, a communication node, and a storage medium, thus the precision of channel state represented by channel state information is improved effectively, and further, the feedback overhead is saved.

In a first aspect, embodiments of the present disclosure provide a channel state information transmission method, applied to a first communication node, the method includes:

receiving configuration information of a second communication node;

receiving a channel state information reference signal sent by the second communication node, according to the configuration information; and reporting channel state information according to the configuration information, where the channel state information is determined according to the channel state information reference signal;

where the configuration information includes configuration information of the channel state information.

In a second aspect, the embodiments of the present disclosure provide a channel state information transmission method, applied to a second communication node, the method includes:

transmitting configuration information;

acquiring channel state information sent by a first communication node, where the channel state information is reported according to the configuration information;

where the configuration information includes configuration information of the channel state information.

In a third aspect, the embodiments of the present disclosure provide a channel state information transmission apparatus, configured at a first communication node, the apparatus includes:

a first receiving module, configured to receive configuration information of a second communication node;

a second receiving module, configured to receive a channel state information reference signal sent by the second communication node, according to the configuration information; and a reporting module, configured to report channel state information according to the configuration information, where the channel state information is determined according to the channel state information reference signal;

where the configuration information includes configuration information of the channel state information.

In a fourth aspect, the embodiments of the present disclosure provide a channel state information transmission apparatus, configured at a second communication node, the apparatus includes:

a transmitting module, configured to transmit configuration information;

an acquiring module, configured to acquire channel state information sent by a first communication node, where the channel state information is reported according to the configuration information;

where the configuration information includes configuration information of the channel state information.

In a fifth aspect, the embodiments of the present disclosure provide a communication node, including:

one or more processors; and a storage means, configured to store one or more programs;

the one or more programs, upon being executed by the one or more processors, cause the one or more processors to implement any one of the channel state information transmission methods as provided by the embodiments of the present disclosure.

In a sixth aspect, the embodiments of the present disclosure provide a storage medium with a computer program stored thereon, the computer program, upon being executed by a processor, implements any one of the channel state information transmission methods in the embodiments of the present disclosure.

With regard to the above embodiments and other aspects of the present disclosure, and the implementations thereof, more explanations are provided in the drawings, the detailed description, and the claims.

BRIEF DESCRIPTION OF THE DRAWINGS

FIG. 1 is a flow diagram of a channel state information transmission method provided by the embodiments of the present disclosure;

FIG. 2 is a flow diagram of a channel state information transmission method provided by the embodiments of the present disclosure;

DETAILED DESCRIPTION

Figure 3:
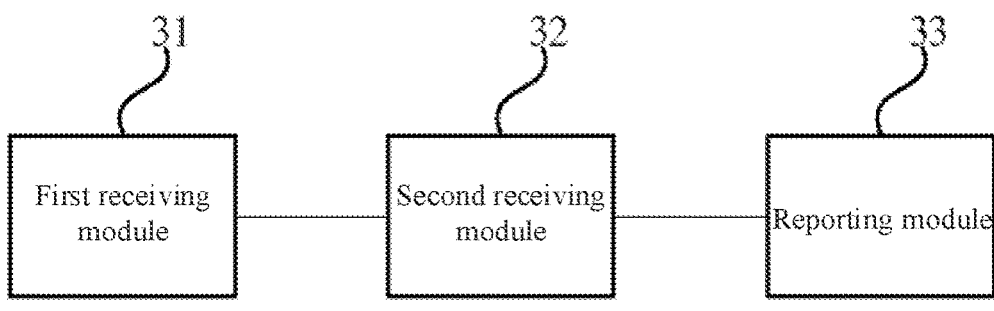
FIG. 3 is a structural diagram of a channel state information transmission apparatus provided by the embodiments of the present disclosure.

In order to make the purpose, technical solutions, and advantages of the present disclosure clearer, the embodiments of the present disclosure will be described in detail below in conjunction with the drawings. It should be noted that, without conflict, the embodiments in the present disclosure and features in the embodiments may be arbitrarily combined with each other.

The steps shown in the flowcharts of the drawings may be performed in, for example, a computer system with a set of computer-executable instructions. And, although the logical order is shown in the flowchart, in some cases, the shown or described steps may be performed in an order different from the order herein.

In an exemplary implementation, FIG. 1 is a flow diagram of a channel state information transmission method provided by the embodiments of the present disclosure. The method may be applied to a case of improving the precision of the channel state represented by the channel state information, and the method may be performed by a channel state information transmission apparatus, the apparatus may be implemented by software and/or hardware and integrated on a first communication node, and the first communication node may be a terminal, such as a user equipment.

Wireless communication has developed to the 5th generation communication technology. Herein, long term evolution (LTE) technology in the 4-th generation wireless communication technology and new radio (NR) technology in the 5-th generation wireless communication technology are based on the orthogonal frequency division multiplexing (OFDM) technology; in the OFDM technology, the smallest frequency domain unit is a subcarrier, and the smallest time domain unit is an OFDM symbol; in order to facilitate the usage of a frequency domain resource, a resource block (RB) is defined, and a resource block is defined as a specific number of continuous sub-carriers; a bandwidth block (bandwidth part, BWP) is further defined, and a bandwidth block is defined as another specific number of continuous resource blocks on a carrier; in order to facilitate the usage of a time domain resource, a slot is defined, and a slot is defined as yet another specific number of continuous OFDM symbols. A method for acquiring channel state information in a wireless communication system, and a method for utilizing channel state information are as follows.

A base station sends a reference signal; a terminal measures the reference signal, determines channel state information from the base station to the terminal, and reports the channel state information to the base station; and the base station receives the channel state information reported by the terminal. The base station determines a strategy of data transmission according to channel state represented by received channel state information, and transmits data, thereby improving the efficiency of data transmission. The precision of the channel state represented by the channel state information affects the transmission strategy of the base station, thereby affecting the efficiency of data transmission.

The development of wireless communication technology requires a further design of a mechanism for acquiring channel state information, so as to improve the precision of the obtained channel state, increase the flexibility of acquiring channel state information, reduce the overhead of the used resource, and reduce the complexity of the system.

A reference signal sent by the base station to the terminal is a downlink reference signal; the downlink reference signal for channel state information in the LTE system includes a cell-specific reference signal (CRS), a channel state information reference signal (CSI-RS); the downlink reference signal for channel state information in the NR system includes a channel state information reference signal (CSI-RS). The channel state information reference signal (CSI-RS) is carried by a channel state information reference signal resource (CSI-RS Resource), the channel state information reference signal resource is composed of code division multiplexing (CDM) groups, and a CDM group is composed of radio resource elements, on which the CSI-RS of a group of CSI-RS ports is multiplexed by means of code division multiplexing.

A content of the channel state information transmitted between the base station and the terminal includes a channel quality indicator (CQI), where the CQI is used to indicate the quality of the channel; or includes a precoding matrix indicator (PMI), where the PMI is used to indicate a precoding matrix applied onto a base station antenna. A reporting format of a type of CQI is a wideband CQI reporting, i.e., a channel quality is reported for a channel state information band (CSI reporting band), and the channel quality corresponds to the entire channel state information band; a reporting format of another type of CQI is a subband CQI reporting, i.e., channel qualities are given in a unit of a subband for the channel state information band (CSI reporting band) respectively, where one channel quality corresponds to one subband, i.e., a channel quality is reported for each subband of the channel state information band. The subband is a frequency domain unit, and is defined as N continuous resource blocks (RB), N is a positive integer; for the convenience of description, the subband is called a channel quality indication subband, or a CQI subband, or a subband in the present disclosure; where N is called as a size of a CQI subband, or a CQI subband size, or a subband size. The bandwidth block is divided into subbands, and a channel state information band (CSI reporting band) is defined by a subset of subbands of the bandwidth block. The channel state information band (CSI reporting band) is a band on which the channel state information needs to be reported.

One way to determine a channel quality is to determine a channel quality according to the strength of the reference signal received by the terminal; and another way to determine a channel quality is to determine a channel quality according to a signal-to-interference-noise ratio of the received reference signal. On a channel state information band, if the channel quality does not change much, the resource overhead for CQI reporting may be reduced by reporting CQI by means of the wideband CQI; and if the channel quality varies greatly in the frequency domain, the precision of CQI reporting may be increased by reporting CQI by means of the subband CQI.

A reporting format of a type of PMI is a wideband PMI reporting, i.e., a PMI is reported for a channel state information band (CSI reporting band), and the PMI corresponds to the entire channel state information band. A reporting format of another type of PMI is a subband PMI reporting, i.e., a PMI is reported for each subband of the channel state information band, or a component of a PMI is reported for each subband of the channel state information band. For example, PMI is composed of X1 and X2, where one way to report a component of a PMI for each subband of the channel state information band is to report an X1 for the entire band and report an X2 for each subband; and another way is to report an X1 and an X2 for each subband.

A reporting format of yet another type of PMI is that the reported PMI indicates R precoding matrices for each subband, where R is a positive integer. In the sense of feeding back a frequency-domain granularity of the precoding matrix. R also represents a number of precoding matrix subbands included in each subband, or a number of precoding matrix subbands included in each CQI subband.

In order to improve the precision of the channel state represented by the channel state information and save the feedback overhead. As shown in FIG. 1, the embodiments of the present disclosure provide a channel state information transmission method, where the method includes the following steps.

S110: receiving configuration information of a second communication node.

The configuration information includes configuration information of channel state information. The configuration information may also include configuration information of channel state information reference signal. The first communication node may report the channel state information based on the configuration information of the channel state information, receive and measure the channel state information reference signal based on the configuration information of the channel state information reference signal.

This embodiment does not limit the content included in the configuration information of the channel state information. In an embodiment, the configuration information of the channel state information may include a reporting format of a precoding matrix indicator, and information indicated by the reporting format of the precoding matrix indicator is not limited herein.

S120: receiving a channel state information reference signal sent by the second communication node according to the configuration information.

After the channel state information reference signal is received, this embodiment may measure the channel state information reference signal, so as to determine the channel state information.

S130: reporting channel state information according to the configuration information, where the channel state information is determined according to the channel state information reference signal.

After the channel state information is determined, this step may report the channel state information to the second communication node according to the configuration information of the channel state information.

In an embodiment, the channel state information includes a precoding matrix indicator, where a precoding matrix indicated by the precoding matrix indicator is determined by a first set of vectors, or determined by the first set of vectors and a second set of vectors; the first set of vectors includes L vectors, and the second set of vectors includes $M_v$ vectors, where L and $M_v$ are positive integers; where one vector in the first set of vectors corresponds to one port of the channel state information reference signal; one vector in the second set of vectors is a Discrete Fourier Transform (DFT) vector with an index number of $$n_3^{(f)};$$

where an element of the DFT vector with the index number of $$n_3^{(f)}$$

is:

$$e^{j\frac{2\pi t n_3^{(f)}}{N_3}},$$

where t={0, 1 . . . , $N_3$−1}, $N_3$ is a number of the precoding matrix.

Herein, t is an index number of the element in the DFT vector, and a value of t is 0, 1 . . . , $N_3$−1. t may also represent an index number of the precoding matrix. t may also represent an index number of a frequency domain unit, and a value of t corresponds to a frequency domain unit. For example, a precoding matrix with an index number of t corresponding to an element with an index number of t of the DFT vector in the second set of vectors is a precoding matrix of the frequency domain unit with an index number of t.

The precoding matrix may be only composed of the first set of vectors, or may be composed of the first set of vectors and the second set of vectors.

In an embodiment, the precoding matrix is only composed of the first set of vectors. For example: W=$W_1W_2$, where W represents the precoding matrix, $W_1$ represents a matrix composed of the first set of vectors, and $W_2$ represents a matrix composed of coefficients of the first set of vectors.

In an embodiment, the precoding matrix is composed of the first set of vectors and the second set of vectors. For example:

$$W = W_1 W_2 W_f^H,$$

where W represents the precoding matrix, $W_1$ represents a matrix composed of the first set of vectors, $W_f$ represents a matrix composed of the second set of vectors, $$W_f^H$$

represents a transposed conjugate matrix of $W_f$, and $W_2$ represents a matrix composed of joint coefficients of the first set of vectors and the second set of vectors.

The second communication node may indicate through the configuration information of the channel state information: whether the precoding matrix is only composed of the first set of vectors, or the precoding matrix is composed of the first set of vectors and the second set of vectors. That is, the second communication node may indicate: whether the precoding matrix includes the second set of vectors through the configuration information of the channel state information.

In an embodiment, the precoding indicator (also referred as precoding matrix indicator) includes a coefficient of a vector constituting the precoding matrix, and whether to omit the coefficient of the vector constituting the precoding matrix may be determined according to a corresponding priority.

In an embodiment, a polarization direction where a strongest coefficient of a vector constituting the precoding matrix is located may be a strong polarization direction, and another polarization direction may be a weak polarization direction. The precoding matrix includes two polarization directions, where another polarization direction except the strong polarization direction is the weak polarization direction.

In an embodiment, the channel state information includes a number of coefficients that need to be reported among coefficients of vectors constituting the precoding matrix, and whether to indicate a strongest coefficient is determined according to a number of the coefficients that need to be reported. Whether to indicate positions of coefficients that need to be reported by means of bit mapping is determined according to a number of the coefficients that need to be reported.

A channel state information transmission method provided by the present disclosure receives configuration information of a second communication node; receives a channel state information reference signal sent by the second communication node according to the configuration information; reports channel state information according to the configuration information, where the channel state information is determined according to the channel state information reference signal; where the configuration information includes configuration information of the channel state information. The method determines and reports the channel state information directly based on the configuration information, thereby feedback overhead is saved, and the channel state can be determined more accurately, thereby facilitating the second communication node to make an accurate transmission strategy, and further, improving the efficiency of data transmission.

On the basis of the above embodiments, variant embodiments of the above embodiments are proposed. It should be noted herein that, in order to simplify the description, only differences from the above embodiments are described in the variant embodiments.

In an embodiment, the configuration information of the channel state information includes a reporting format of the precoding matrix indicator, where the reporting format of the precoding matrix indicator indicates at least one of the following information:

a value of $M_v$, or a range of a value of $M_v$;

whether the channel state information includes a reporting of the $M_v$ vectors; and whether the precoding matrix includes the second set of vectors.

The reporting format of the precoding matrix indicator indicates at least one of the following information:

a value of $M_v$; whether the channel state information includes a reporting of the $M_v$ vectors; and whether the precoding matrix includes the second set of vectors.

The reporting format of the precoding matrix indicator indicates at least one of the following information:

a range of a value of $M_v$; whether the channel state information includes a reporting of the $M_v$ vectors; and whether the precoding matrix includes the second set of vectors.

The configuration information of the channel state information includes a reporting format of PMI, where the reporting format of the PMI indicates whether the precoding matrix includes the second set of vectors. That is, the reporting format of the PMI indicates whether the precoding matrix is only composed of the first set of vectors, or the precoding matrix is composed of the first set of vectors and the second set of vectors. For example, the reporting format of the PMI being a wideband PMI reporting indicates that the precoding matrix does not include the second set of vectors correspondingly, or indicates that the precoding matrix is only composed of the first set of vectors. The reporting format of the PMI being a subband PMI reporting indicates that the precoding matrix includes the second set of vectors correspondingly, or indicates that the precoding matrix is composed of the first set of vectors and the second set of vectors. Adopting the PMI reporting format to implicitly indicate a component of the precoding (i.e., the precoding matrix) may not need to add a signaling to indicate the components of the precoding matrix, so as to save the signaling overhead and improve the efficiency of the system.

The precoding matrix includes the second set of vectors, and the second communication node may indicate a value of $M_v$, or a range of a value of $M_v$ through the configuration information of the channel state information. The configuration information of the channel state information includes a reporting format of the PMI, the reporting format of the PMI indicates the value of $M_v$, or the range of the value of $M_v$. For example, the reporting format of the PMI being a wideband PMI reporting indicates that the value of $M_v$ is 1 correspondingly. For example, the reporting format of the PMI being a subband PMI reporting indicates that the value of $M_v$ is 2 correspondingly, or indicates that the value of $M_v$ is greater than 1. Adopting the PMI reporting format to implicitly indicate the value of $M_v$, or the range of the value of $M_v$, may not need to add a signaling to indicate the value of $M_v$, or the range of the value of $M_v$, so as to save the signaling overhead and improve the efficiency of the system.

There is a problem of whether the first communication node reports the second set of vectors, that is, there is a problem of whether the channel state information includes a reporting of the $M_v$ vectors. For example, the precoding matrix is only composed of the first set of vectors, where the first communication node does not need to report the second set of vectors; and the precoding matrix is composed of the first set of vectors and the second set of vectors, where the first communication node needs to report the second set of vectors. For another example, the precoding matrix includes the second set of vectors, the second set of vectors is predetermined by a protocol, and the first communication node does not need to report the second set of vectors; and the second set of vectors is not predetermined, where the terminal (i.e., the first communication node) needs to report the second set of vectors. For example, the value of $M_v$ is 1, the second set of vectors is a vector of which elements are all 1, where the terminal does not need to report the second set of vectors; the value of $M_v$ is 2, or greater than 1, the second set of vectors is not predetermined, where the terminal needs to report the second set of vectors. The base station (i.e., the second communication node) may indicate whether to report the second set of vectors through the configuration information of the channel state information. The configuration information of the channel state information includes the reporting format of the PMI, and the reporting format of the PMI indicates whether to report the second set of vectors. For example, the reporting format of the PMI being a wideband PMI reporting indicates that the terminal does not report the second set of vectors correspondingly. For example, the reporting format of the PMI being a subband PMI reporting indicates that the terminal reports the second set of vectors correspondingly. Adopting the PMI reporting format to implicitly indicate whether to report the second set of vectors, may not need to add a signaling to indicate whether to report the second set of vectors, so as to save the signaling overhead and improve the efficiency of the system.

In an embodiment, the precoding matrix indicator includes a coefficient of a vector constituting the precoding matrix, and a priority of the coefficient of the vector is determined according to at least one of the following:

the precoding matrix indicator includes a position of a vector in the second set of vectors corresponding to a strongest coefficient, where the priority of the coefficient of the vector is determined according to a relative position of a position of a vector in the second set of vectors corresponding to the coefficient of the vector to the position of the vector in the second set of vectors corresponding to the strongest coefficient;

the precoding matrix indicator includes a position of a vector in the first set of vectors corresponding to a strongest coefficient, where the priority of the coefficient of the vector is determined according to a relative position of a position of a vector in the first set of vectors corresponding to the coefficient of the vector to the position of the vector in the first set of vectors corresponding to the strongest coefficient;

the smaller an index number of a vector in the second set of vectors corresponding to the coefficient of the vector, the higher a priority of the coefficient of the vector, or the greater an index number of a vector in the second set of vectors corresponding to the coefficient of the vector, the lower a priority of the coefficient of the vector; and the precoding matrix indicator includes an indication of a strong polarization direction vector in the first set of vectors, where a priority of a coefficient of the strong polarization direction vector is higher than a priority of a coefficient of a corresponding weak polarization direction vector.

The channel state information includes a precoding indicator, also called as a precoding matrix indicator, which includes coefficients of vector (i.e., a vector constituting the precoding matrix). Usually, it is common to encounter that a resource for feeding back the channel state information is not enough to feed back a content of the channel state information originally planned to be reported, and thus, coefficients of a part of the vectors need to be omitted. For example, adding a new feedback reporting task on the original resource will result in insufficient resources to feed back the content of the channel state information originally planned to be reported. For another example, since the channel of the resource originally planned to carry the feedback report changes, the capacity of the channel of the corresponding resource is reduced, and thus, it is not enough to carry the content of the channel state information originally planned to be reported. A method for omitting coefficients of a part of the vectors is to omit coefficients with low priorities and retain coefficients with high priorities, according to priorities of the coefficients being higher or lower. Therefore, there is a need for a method or way of determining a priority.

Low priorities described in omitted coefficients with low priorities and high priorities described in retained coefficients with high priorities are not limited herein. For example, the low priorities and the high priorities may be determined by a threshold, or determined by a number of coefficients that need to be omitted, or determined by a number of coefficients that need to be retained.

Herein, the strongest coefficient is a coefficient with the largest amplitude value, or a coefficient with the highest power, among the coefficients.

One way to determine a priority of the coefficient of the vector is that: the precoding indicator includes a position of a vector in the second set of vectors corresponding to the strongest coefficient, and a priority of the coefficient is determined according to a relative position of a position of a vector in the second set of vectors corresponding to the coefficient to the position of the vector corresponding to the strongest coefficient.

An example is as follows: a position of a vector in the second set of vectors corresponding to the strongest coefficient is an index number of the vector in the second set of vectors corresponding to the strongest coefficient, and a position of a vector corresponding to the coefficient of the vector constituting the precoding matrix in the second set of vectors is an index number of a vector in the second set of vectors corresponding to the coefficient. For example, a position of a vector in the second set of vectors corresponding to the strongest coefficient is a value of a parameter f of a vector in the second set of vectors corresponding to the strongest coefficient; a position of a vector corresponding to the coefficient of the vector constituting the precoding matrix in the second set of vectors is a value of a parameter f of a vector in the second set of vectors corresponding to the coefficient.

Another example is as follows: a position of a vector in the second set of vectors corresponding to the strongest coefficient is an index number in the DFT vectors of a vector in the second set of vectors corresponding to the strongest coefficient, and a position of a vector corresponding to the coefficient of the vector constituting the precoding matrix in the second set of vectors is an index number in the DFT vectors of a vector in the second set of vectors corresponding to the coefficient. For example, a position of a vector in the second set of vectors corresponding to the strongest coefficient is a value of a parameter $$n_3^{(f)}$$

of a vector in the second set of vectors corresponding to the strongest coefficient; a position of a vector corresponding to the coefficient of the vector constituting the precoding matrix in the second set of vectors is a value of a parameter $$n_3^{(f)}$$

of a vector in the second set of vectors corresponding to the coefficient.

An example of a relative position of a position of a vector corresponding to the coefficient of the vector constituting the precoding matrix in the second set of vectors to the position of the vector corresponding to the strongest coefficient is that: a difference between a position of a vector in the second set of vectors corresponding to the coefficient (any one of coefficients of vectors constituting the precoding matrix) and the position of the vector corresponding to the strongest coefficient, or a difference obtained by subtracting the position of the vector corresponding to the strongest coefficient from a position of a vector in the second set of vectors corresponding to the coefficient (any one of coefficients of vectors constituting the precoding matrix), or a difference obtained by subtracting a position of a vector in the second set of vectors corresponding to the coefficient (any one of coefficients of vectors constituting the precoding matrix) from the position of the vector corresponding to the strongest coefficient.

Another example of a relative position of a position of a vector corresponding to the coefficient of the vector constituting the precoding matrix in the second set of vectors to the position of the vector corresponding to the strongest coefficient is that: an absolute value of a difference between the position of the vector corresponding to the coefficient of the vector constituting the precoding matrix in the second set of vectors and the position of the vector corresponding to the strongest coefficient.

An example of the priority of the coefficient of the vector constituting the precoding matrix being determined according to the relative position of the position of the vector in the second set of vectors corresponding to the coefficient to the position of the vector corresponding to the strongest coefficient is that: the greater the value of the relative position, the lower the priority: or, the smaller the value of the relative position, the higher the priority. Therefore, components with high energy are retained, and components with low energy are omitted, so that the fed-back precoding matrix is closer to the channel, and the receiving energy of the signal transmitted according to this precoding matrix is the largest. Thus, it is beneficial to improving the signal-to-noise ratio and improving the communication capacity.

Another example of the priority of the coefficient of the vector constituting the precoding matrix being determined according to the relative position of the position of the vector in the second set of vectors corresponding to the coefficient to the position of the vector corresponding to the strongest coefficient is that: the greater the value of the relative position, the higher the priority; or, the smaller the value of the relative position, the lower the priority. Therefore, components with high energy are omitted, and components with low energy are retained, so that the fed-back precoding matrix is closer to a null space of the channel, and the receiving energy of the signal transmitted according to this precoding matrix may be as small as possible. Therefore, the interference of the signal transmitted according to this precoding matrix to the receiving end may be reduced, which is beneficial to reducing the interference, improving the signal-to-noise ratio, and improving the communication capacity.

For example, the priority of the coefficient of the vector constituting the precoding matrix is determined according to the priority value of the coefficient, where the smaller the priority value of the coefficient, the higher the priority of the coefficient, or the greater the priority value of the coefficient, the lower the priority of the coefficient; the priority value of the coefficient is determined according to a relative position of a position of a vector in the second set of vectors corresponding to the coefficient to the position of the vector corresponding to the strongest coefficient; the greater the value of the relative position, the larger the priority value; or, the smaller the value of the relative position, the smaller the priority value.

For example, the priority value of the coefficient is: $\mathrm{Pri}(l, i, f) = L \cdot v \cdot \pi_2 (f, f_{sci}) + v \cdot i + l$; where $l$ is an index number of a vector in the first set of vectors, $i$ is an index number of a layer, $f$ is an index number of a vector in the second set of vectors, $v$ is a number of layers, i.e., a rank; $\mathrm{Pri}(l, i, f)$ is a priority value of a joint coefficient of a vector with the index number of $l$ in the first set of vectors and a vector with the index number of $f$ in the second set of vectors in a i-th layer;

$f_{sci}$ is an index number of a vector in the second set of vectors corresponding to the strongest coefficient, and $\pi_2 (f, f_{sci})$ is a relative position of a position of a vector in the second set of vectors corresponding to the coefficient to the position of the vector corresponding to the strongest coefficient.

Another way to determine the priority of the coefficient of the vector is that: the precoding indicator includes a position of a vector corresponding to the strongest coefficient in the first set of vectors, and the priority of the coefficient of the vector constituting the precoding matrix is determined according to a relative position of a position of a vector in the first set of vectors corresponding to the coefficient to the position of the vector corresponding to the strongest coefficient.

An example is as follows: a position of a vector in the first set of vectors corresponding to the strongest coefficient is an index number of a vector in the first set of vectors corresponding to the strongest coefficient, and the position of the vector corresponding to the coefficient of the vector constituting the precoding matrix in the first set of vectors is an index number of a vector corresponding to the coefficient in the first set of vectors. For example, the position of the vector corresponding to the strongest coefficient in the first set of vectors is a value of a parameter l of a vector in the first set of vectors corresponding to the strongest coefficient; the position of the vector corresponding to the coefficient of the vector constituting the precoding matrix in the first set of vectors is a value of the parameter l of a vector in the first set of vectors corresponding to the coefficient.

Another example is as follows: a position of a vector in the first set of vectors corresponding to the strongest coefficient is an index number of a CSI-RS port corresponding to the vector in the first set of vectors corresponding to the strongest coefficient, and a position of a vector in the first set of vectors corresponding to the coefficient is an index number of a CSI-RS port corresponding to the vector corresponding to the coefficient in the first set of vectors. For example, the position of the vector in the first set of vectors corresponding to the strongest coefficient is an index number of a CSI-RS port corresponding to the vector in the first set of vectors corresponding to the strongest coefficient; the position of the vector corresponding to the coefficient of the vector constituting the precoding matrix in the first set of vectors is an index number of a CSI-RS port corresponding to the vector in the first set of vectors corresponding to the coefficient.

An example of a relative position of a position of a vector in the first set of vectors corresponding to the coefficient of the vector constituting the precoding matrix to the position of the vector corresponding to the strongest coefficient is that: a difference between a position of a vector in the first set of vectors corresponding to the coefficient (any one of coefficients of vectors constituting the precoding matrix) and the position of the vector corresponding to the strongest coefficient, or a difference obtained by subtracting the position of the vector corresponding to the strongest coefficient from a position of a vector in the first set of vectors corresponding to the coefficient (any one of coefficients of vectors constituting the precoding matrix), or a difference obtained by subtracting a position of a vector in the first set of vectors corresponding to the coefficient (any one of coefficients of vectors constituting the precoding matrix) from the position of the vector corresponding to the strongest coefficient. Another example of a relative position of a position of a vector in the first set of vectors corresponding to the coefficient of the vector constituting the precoding matrix to the position of the vector corresponding to the strongest coefficient is that: an absolute value of a difference between the position of the vector in the first set of vectors corresponding to the coefficient (any one of coefficients of vectors constituting the precoding matrix) and the position of the vector corresponding to the strongest coefficient.

An example of the priority of the coefficient of the vector constituting the precoding matrix being determined according to the relative position of the position of the vector in the first set of vectors corresponding to the coefficient to the position of the vector corresponding to the strongest coefficient is that: the greater the value of the relative position, the lower the priority; or, the smaller the value of the relative position, the higher the priority. Therefore, components with high energy are retained, and components with low energy are omitted, so that the fed-back precoding matrix is closer to the channel, and the receiving energy of the signal transmitted according to this precoding matrix is the largest. Thus, it is beneficial to improving the signal-to-noise ratio and improving the communication capacity.

Another example of the priority of the coefficient of the vector constituting the precoding matrix being determined according to the relative position of the position of the vector in the first set of vectors corresponding to the coefficient to the position of the vector corresponding to the strongest coefficient is that: the greater the value of the relative position, the higher the priority; or, the smaller the value of the relative position, the lower the priority. Therefore, components with high energy are omitted, and components with low energy are retained, so that the fed-back precoding matrix is closer to a null space of the channel, and the receiving energy of the signal transmitted according to this precoding matrix may be as small as possible. Therefore, the interference of the signal transmitted according to this precoding matrix to the receiving end may be reduced, which is beneficial to reducing the interference, improving the signal-to-noise ratio, and improving the communication capacity.

For example, the priority of the coefficient of the vector constituting the precoding matrix is determined according to the priority value of the coefficient, where the smaller the priority value of the coefficient, the higher the priority of the coefficient, or the greater the priority value of the coefficient, the lower the priority of the coefficient; the priority value of the coefficient is determined according to the relative position of the position of the vector in the first set of vectors corresponding to the coefficient to the position of the vector corresponding to the strongest coefficient; the greater the value of the relative position, the larger the priority value; or, the smaller the value of the relative position, the smaller the priority value.

For example, the priority value of the coefficient is: $Pri(l, i, f) = L \cdot v \cdot f + v \cdot i + \pi_1(l, l_{sci})$; where l is an index number of a vector in the first set of vectors, i is an index number of a layer, f is an index number of a vector in the first set of vectors, v is a number of layers, i.e., a rank; $Pri(l, i, f)$ is a priority value of a joint coefficient of a vector with the index number of l in the first set of vectors and a vector with the index number of f in the first set of vectors in a i-th layer; $l_{sci}$ is an index number of a vector in the first set of vectors corresponding to the strongest coefficient, and $\pi_1(l, l_{sci})$ is a relative position of a position of a vector in the first set of vectors corresponding to the coefficient to the position of the vector corresponding to the strongest coefficient.

In another example, the priority of the coefficient of the vector constituting the precoding matrix is determined according to the following way.

The precoding indicator includes a position of a vector in the second set of vectors corresponding to the strongest coefficient, and a position of a vector in the first set of vectors corresponding to the strongest coefficient; the priority of the coefficient of the vector constituting the precoding matrix is determined jointly, according to the relative position of the position of the vector in the second set of vectors corresponding to the coefficient of the vector constituting the precoding matrix to the position of the vector in the second set of vectors corresponding to the strongest coefficient and the relative position of the position of the vector in the first set of vectors corresponding to the coefficient of the vector constituting the precoding matrix to the position of the vector in the first set of vectors corresponding to the strongest coefficient.

For example, the priority of the coefficient of the vector constituting the precoding matrix is determined according to the priority value of the coefficient, where the smaller the priority value of the coefficient, the higher the priority of the coefficient, or the greater the priority value of the coefficient, the lower the priority of the coefficient; the priority value of the coefficient is determined jointly, according to the relative position of the position of the vector in the second set of vectors corresponding to the coefficient to the position of the vector in the second set of vectors corresponding to the strongest coefficient and the relative position of the position of the vector in the first set of vectors corresponding to the coefficient to the position of the vector in the first set of vectors corresponding to the strongest coefficient.

For example, the priority value of the coefficient is: $Pri(l, i, f) = L \cdot v \cdot \pi_2(f, f_{sci}) + v \cdot i + \pi_1(l, l_{sci})$; where l is an index number of a vector in the first set of vectors, i is an index number of a layer, f is an index number of a vector in the first set of vectors, v is a number of layers, i.e., a rank; $Pri(l, i, f)$ is a priority value of a joint coefficient of a vector with the index number of l in the first set of vectors and a vector with the index number of f in the first set of vectors in a i-th layer; $l_{sci}$ is an index number of a vector in the first set of vectors corresponding to the strongest coefficient, $\pi_1(l, l_{sci})$ is a relative position of a position of a vector in the first set of vectors corresponding to the coefficient to the position of the vector in the first set of vectors corresponding to the strongest coefficient; $f_{sci}$ is an index number of a vector in the second set of vectors corresponding to the strongest coefficient, and $\pi_2(f, f_{sci})$ is a relative position of a position of a vector in the second set of vectors corresponding to the coefficient to the position of the vector in the second set of vectors corresponding to the strongest coefficient.

In another example, the priority of the coefficient of the vector constituting the precoding matrix is determined according to the following way.

The smaller an index number of a vector corresponding to the coefficient of the vector in the second set of vectors constituting the precoding matrix, the higher the priority, or, the greater an index number of a vector corresponding to the coefficient of the vector in the second set of vectors constituting the precoding matrix, the lower the priority.

For example, the priority of the coefficient of the vector constituting the precoding matrix is determined according to the priority value of the coefficient, where the smaller the priority value of the coefficient, the higher the priority of the coefficient, or the greater the priority value of the coefficient, the lower the priority of the coefficient; the smaller the index number of the vector in the second set of vectors corresponding to the coefficient, the smaller the priority value, or the greater the index number of the vector in the second set of vectors corresponding to the coefficient, the greater the priority value.

For example, the priority value of the coefficient is: $Pri(l, i, f) = L \cdot v \cdot f + v \cdot i + l$; or $Pri(l, i, f) = L \cdot v \cdot f + v \cdot i + \pi_1 (l, l_{sci})$; where $l$ is an index number of a vector in the first set of vectors, $i$ is an index number of a layer, $f$ is an index number of a vector in the first set of vectors, $v$ is a number of layers, i.e., a rank; $Pri(l, i, f)$ is a priority value of a joint coefficient of a vector with the index number of $l$ in the first set of vectors and a vector with the index number of $f$ in the first set of vectors in $i$-th layer; $l_{sci}$ is an index number of a vector in the first set of vectors corresponding to the strongest coefficient, and $\pi_1 (l, l_{sci})$ is a relative position of a position of a vector in the first set of vectors corresponding to the coefficient to the position of the vector in the first set of vectors corresponding to the strongest coefficient.

Another example of the relative position $\pi_1 (l, l_{sci})$ of a position of a vector in the first set of vectors corresponding to the coefficient of the vector constituting the precoding matrix to the position of the vector corresponding to the strongest coefficient is that: a function of a difference between the position of the vector in the first set of vectors corresponding to the coefficient and the position of the vector corresponding to the strongest coefficient. For example, $\pi_1 (l, l_{sci})$ is a function of a difference between $l$ and $l_{sci}$. For example:

$$\pi_1 (l, l_{sci}) = \begin{cases} \min(2(l - l_{sci}), \ 2(l_{sci} - l + L) - 1), & l > l_{sci} \\ \min(2(l_{sci} - l) - 1, \ 2(l - l_{sci} + L)), & l \le l_{sci} \end{cases};$$

or, $$\pi_1 (l, l_{sci}) = \min\{2 \cdot \mathrm{mod}(l - l_{sci}, L), \ 2\mathrm{mod}(l_{sci} - l, L) - 1\};$$

or, $$\pi_1 (l, l_{sci}) = \begin{cases} 2(l - l_{sci}), & l > l_{sci} \\ 2(l_{sci} - l) - 1, & l \le l_{sci} \end{cases}.$$

For example, $\pi_1 (l, l_{sci})$ is a function of a difference between an index number $p^{(l)}$ of a CSI-RS port corresponding to a vector in the first set of vectors corresponding to the coefficient and an index number $p^{(l_{sci})}$ of a CSI-RS port corresponding to a vector in the first set of vectors corresponding to the strongest coefficient. For example, $$\pi_1 (l, l_{sci}) = \begin{cases} \min\left(2\left(p^{(l)} - p^{(l_{sci})}\right), \ 2\left(p^{(l_{sci})} - p^{(l)} + P\right) - 1\right), & p^{(l)} > p^{(l_{sci})} \\ \min\left(2\left(p^{(l_{sci})} - p^{(l)}\right) - 1, \ 2\left(p^{(l)} - p^{(l_{sci})} + P\right)\right), & p^{(l)} \le p^{(l_{sci})} \end{cases};$$

or, $$\pi_1 (l, l_{sci}) = \min\{2 \cdot \mathrm{mod}\left(p^{(l)} - p^{(l_{sci})}, P\right), \ 2\mathrm{mod}\left(p^{(l_{sci})} - p^{(l)}, P\right) - 1\};$$

or, $$\pi_1 (l, l_{sci}) = \begin{cases} 2\left(p^{(l)} - p^{(l_{sci})}\right), & p^{(l)} > p^{(l_{sci})} \\ 2\left(p^{(l_{sci})} - p^{(l)}\right) - 1, & p^{(l)} \le p^{(l_{sci})} \end{cases};$$

where $P$ is a number of CSI-RS ports.

The precoding matrix indicator includes an indication of a strong polarization direction vector in the first set of vectors, a priority of a coefficient of the strong polarization direction vector is higher than a priority of a coefficient of a corresponding weak polarization direction vector. For example, the priority of the coefficient of vector constituting the precoding matrix is determined according to the priority value of the coefficient, where the smaller the priority value of the coefficient, the higher the priority of the coefficient, or the greater the priority value of the coefficient, the lower the priority of the coefficient. For example, an index number corresponding to the strong polarization direction vector is less than $L/2$, and the priority value of the coefficient is: $Pri(l, i, f) = L \cdot v \cdot f + v \cdot i + l$; an index number corresponding to the strong polarization direction vector is greater than or equal to $L/2$, the priority value of the coefficient is: $Pri(l, i, f) = L \cdot v \cdot f + v \cdot i + \mathrm{mod}(l + L/2, L)$.

In an embodiment, whether to omit the coefficient of the vector is determined according to the priority of the coefficient, where the configuration information of the channel state information includes a number of coefficients retained in the channel state information after the omitting operation is performed; or, the configuration information of the channel state information includes a number of coefficients that should be omitted upon entering the omitting operation.

The number of coefficients retained in the channel state information after the omitting operation is performed is fixed and does not have flexibility. However, the configuration information of the channel state information being used to configure the coefficients retained in the channel state information after the omitting operation is performed, has flexibility.

In an embodiment, whether to omit the coefficient of the vector is determined according to the priority of the coefficient, where the channel state information includes a number of coefficients retained in the channel state information after the omitting operation is performed; or, the channel state information includes a number of coefficients that should be omitted upon entering the omitting operation.

Reporting, in the channel state information, a number of coefficients retained in the channel state information after the omitting operation is performed, not only has flexibility, but also is adaptable to changes in a resource carrying the channel state information, which may not waste the resource and may also guarantee the correct transmission of the channel state information.

In an embodiment, a polarization direction where a strongest coefficient of a vector constituting the precoding matrix is located is a strong polarization direction, and another polarization direction is a weak polarization direction.

Herein, a non-zero coefficient $$C_i^{weak}$$

of a weak polarization direction corresponds to a non-zero coefficient $$C_i^{strong}$$

of a strong polarization direction, that is, the non-zero coefficient of the weak polarization direction and the non-zero coefficient of the strong polarization direction may be in a one-to-one correspondence relationship, and each non-zero coefficient of the weak polarization direction may correspond to a non-zero coefficient of the strong polarization direction.

A differential of an amplitude of a non-zero coefficient of the weak polarization direction with respect to an amplitude of a non-zero coefficient corresponding to the strong polarization direction is $$\left|C_i^{diff\_weak}\right|,$$

where $$\left|C_i^{weak}\right| = \left|C_i^{strong}\right| \cdot \left|C_i^{diff\_weak}\right|,$$

the precoding matrix indicator includes the differential $$\left|C_i^{diff\_weak}\right|$$

of the amplitude of the non-zero coefficient of the weak polarization direction with respect to the amplitude of the non-zero coefficient corresponding to the strong polarization direction; where i represents an index number of a coefficient, $$\left|C_i^{weak}\right|$$

represents an amplitude of the coefficient of the weak polarization direction, and $$\left|C_i^{strong}\right|$$

represents an amplitude of the coefficient of the strong polarization direction.

In the related technology, a common reference value is used for amplitudes of all coefficients of the weak polarization direction, and a differential of the amplitude of the coefficient of the weak polarization direction with respect to this common reference value is fed back in the precoding indicator. This results in a problem: since the common reference value is adopted, a dynamic range of the differential of the amplitude of the coefficient of the weak polarization direction is large, and thus, a quantization precision of the differential of the amplitude of the coefficient of the weak polarization direction is poor. However, the precoding indicator includes the differential $$\left|C_i^{diff\_weak}\right|$$

of an amplitude of a non-zero coefficient of the weak polarization direction with respect to an amplitude of a non-zero coefficient corresponding to the strong polarization direction, so that the dynamic range of the difference $$\left|C_i^{diff\_weak}\right|$$

is small, and thus, the quantization precision of the differential is high.

In an embodiment, the channel state information includes a number of coefficients that needs to be reported among coefficients of vectors constituting the precoding matrix, and whether to indicate a strongest coefficient is determined according to a number of the coefficients that need to be reported.

Indicating the strongest coefficient is that: indicating the position of the strongest coefficient; it takes some overhead to indicate the position of the strongest coefficient, but the value of the strongest coefficient may be a default value. For example, an amplitude value is 1 and a phase value is 0 by default, so that there is no need to feed back to the base station explicitly, and may save some overhead. On the whole, adopting the scheme of indicating the location of the strongest coefficient and not feeding back the value of the strongest coefficient explicitly does not necessarily save overhead. The overhead required to indicate the position of the strongest coefficient may be determined according to a number of coefficients that needs to be reported. For example, a number of bits of the overhead that is required is $\lceil \log_2(K^{NZ}) \rceil$, where $K^{NZ}$ represents a number of coefficients that needs to be reported, $\log_2(\cdot)$ represents logarithm operation, and $\lceil \cdot \rceil$ represents rounding up; thus, whether reporting the location of the strongest coefficient is a scheme saving the overhead may be determined according to a number of coefficients that needs to be reported. For example, if a number of coefficients that needs to be reported is greater than a threshold value, it is determined to not to report the position of the strongest coefficient. Or, if a number of coefficients that needs to be reported is less than a threshold value, it is determined that reporting the position of the strongest coefficient is needed. For another example, whether to indicate the position of the strongest coefficient is determined according to a number of coefficients that needs to be reported and a number of layers of the precoding. For example, whether to indicate the position of the strongest coefficient is determined according to a ratio of a number of coefficients that needs to be reported to a number of layers of the precoding. For example, if a ratio of a number of coefficients that needs to be reported to a number of layers of the precoding is greater than a threshold value, it is determined that reporting the position of the strongest coefficient is not needed. For another example, if a ratio of a number of coefficients that needs to be reported to a number of layers of the precoding is smaller than a threshold value, it is determined that reporting the position of the strongest coefficient is needed. Herein, a number of layers of the precoding is also the rank of the precoding.

In an embodiment, the channel state information includes a number of coefficients that needs to be reported among coefficients of vectors constituting the precoding matrix, and whether to indicate positions of the coefficients that needs to be reported by means of bit mapping is determined according to a number of the coefficients that need to be reported.

For example, if a number of coefficients that needs to be reported is greater than a threshold value, it is determined not to indicate the positions of the coefficients that need to be reported by means of bit mapping. For another example, if a number of coefficients that needs to be reported is less than a threshold value, it is determined to indicate the positions of the coefficients that need to be reported by means of bit mapping.

A number of vectors constituting the precoding matrix is large, and thus, a number of the coefficients of the corresponding vectors is also large, so the overhead of feeding back values of the coefficients is also large. In order to save the overhead, values of a part of the coefficients are fed back, and values of another part of the coefficients are not fed back. The coefficients that need to be fed back are indicated by means of bit mapping. On the whole, only feeding back values of a part of the coefficients will save some overhead, but adopting a way of bit mapping to indicate the coefficients that need to be fed back will also cost some overhead, so the scheme of adopting the way of bit mapping to indicate the coefficients that need to be fed back may not necessarily save overhead. Whether adopting bit mapping to indicate the coefficients that need to be fed back is a reasonable way, may be determined according to a number of the coefficients that need to be reported. For example, the corresponding overhead may be calculated according to a number of coefficients that needs to be reported and bit mapping, which is recorded as overhead 1; the overhead of reporting all coefficients without adopting bit mapping to indicate the coefficients that need to be reported, is recorded as overhead 2; which scheme saves overhead may be determined by comparing the overhead 1 with the overhead 2, thus determining which scheme is adopted. That is, whether to indicate the positions of the coefficients that need to be reported by means of bit mapping is determined according to a number of the coefficients that need to be reported.

In an embodiment, whether to indicate the positions of the coefficients that need to be reported by means of bit mapping is determined according to a ratio of a number of coefficients that needs to be reported to $LM_v$.

For example, if the ratio of the number of coefficients that needs to be reported to $LM_v$ is greater than a threshold value, it is determined not to indicate the positions of the coefficients that need to be reported by means of bit mapping. For another example, if the ratio of the number of coefficients that needs to be reported to $LM_v$ is less than a threshold value, it is determined to indicate the positions of the coefficients that need to be reported by means of bit mapping.

For example, the bit mapping is adopted to indicate the coefficients that need to be reported, the overhead of this scheme is recorded as overhead 1, including the overhead of the bit mapping and the overhead of reporting the indicated coefficients; the overhead of the bit mapping is $LM_v r$ bits, the overhead of the coefficients that need to be reported is $cK^{NZ}$ bits, and then a number of bits of the overhead 1 is $LM_v r + cK^{NZ}$. The bit mapping is not adopted to indicate the coefficients that need to be reported, but all coefficients are reported, and thus, the overhead of this scheme is recorded as overhead 2, including the overhead of reporting all coefficients, and a number of bits of the overhead 2 is $cLM_v r$. Where r represents a number of layers of the precoding, or the rank of the precoding, and c represents a number of bits used to feed back a value of a coefficient, for example, if a number of bits for feeding back an amplitude of a coefficient is 4 bits, and a number of bits for feeding back a phase of a coefficient is 3 bits, then feeding back a value of a coefficient is 7 bits. When the overhead 1 is greater than the overhead 2, adopting the bit mapping to indicate the coefficients that need to be reported is inappropriate. The overhead 1 being greater than the overhead 2 is equivalent to $LM_v r + cK^{NZ}$ being greater than $cLM_v r$, equivalent to $ck^{NZ}$ being greater than $(c-1)LM_v r$, equivalent to $$\frac{K^{NZ}}{LM_v r}$$

being greater than $$\frac{c-1}{c},$$

equivalent to $$\frac{K^{NZ}}{LM_v r}$$

being greater than $$1 - \frac{1}{c},$$

and equivalent to $K^{NZ}$ being greater than $$\left(1 - \frac{1}{c}\right) LM_v r.$$

In an embodiment, whether to indicate the positions of the coefficients that need to be reported by means of bit mapping is determined according to a number of layers of the precoding.

For example, if a ratio of a number of coefficients that needs to be reported to $LM_v r$ is greater than a threshold value, it is determined not to indicate the positions of the coefficients that need to be reported by means of bit mapping. For another example, if a ratio of a number of coefficients that needs to be reported to $LM_v r$ is less than a threshold value, it is determined to indicate the positions of the coefficients that need to be reported by means of bit mapping. For another example, if a number of coefficients to be reported is equal to $LM_v r$, it is determined not to indicate the positions of the coefficients that need to be reported by means of bit mapping. For another example, if a number of coefficients to be reported is less than $LM_v r$, it is determined to indicate the positions of the coefficients that need to be reported by means of bit mapping. For another example, corresponding to a number of layers of the precoding being 1, the positions of the coefficients that need to be reported are indicated by means of a combination number, and the positions of the coefficients that need to be reported are not indicated by means of bit mapping. For another example, corresponding to a number of layers of the precoding being 1 and the value of $M_v$ being 1, the positions of the coefficients that need to be reported are indicated by means of a combination number, and the positions of the coefficients that need to be reported are not indicated by means of bit mapping. For example, the positions of the coefficients that need to be reported are indicated by means of a combination number of taking out $K^{NZ}$ coefficients from coefficients of L vectors.

In an exemplary implementation, the present disclosure also provides a channel state information transmission method. FIG. 2 is a flow diagram of a channel state information transmission method provided by the embodiments of the present disclosure, the method may be applied to a case of improving the precision of the channel state represented by the channel state information, the method may be performed by a channel state information transmission apparatus, and the apparatus may be implemented by a software and/or a hardware, and integrated on a second communication node, which may be a base station. Please refer to the above embodiments for details not yet detailed in this embodiment.

As shown in FIG. 2, the present disclosure provides a channel state information transmission method, where the method includes the following steps.

S210: transmitting configuration information.

The configuration information includes configuration information of channel state information.

S220: acquiring channel state information sent by a first communication node, where the channel state information is reported according to the configuration information.

A second communication node may determine a data transmission strategy based on the channel state information after the channel state information is acquired.

The embodiments of the present disclosure provide a channel state information transmission method, where the method transmits the configuration information; acquires the channel state information sent by the first communication node, where the channel state information is reported according to the configuration information, and thus, the method acquires the channel state information reported based on the configuration information by transmitting the configuration information, thereby saving the overhead, and more accurately determining the data transmission strategy, and further, improving the efficiency of the data transmission.

On the basis of the above embodiments, variant embodiments of the above embodiments are proposed, and it should be noted herein that, in order to simplify the description, only differences from the above embodiments are described in the variant embodiments.

In an embodiment, the channel state information includes a precoding matrix indicator, where a precoding matrix indicated by the precoding matrix indicator is determined by a first set of vectors, or determined by the first set of vectors and a second set of vectors; the first set of vectors includes L vectors, and the second set of vectors includes $M_v$ vectors, where L and $M_v$ are positive integers; where one vector in the first set of vectors corresponds to one port of the channel state information reference signal; one vector in the second set of vectors is a DFT vector with an index number of $$n_3^{(f)};$$

where an element of the DFT vector with the index number of $$n_3^{(f)}$$

is:

$$e^{j\frac{2\pi t n_3^{(f)}}{N_3}},$$

where t={0, 1 . . . , $N_3$-1}, $N_3$ is a number of the precoding matrix.

In an embodiment, the configuration information of the channel state information includes a reporting format of the precoding matrix indicator, where the reporting format of the precoding matrix indicator indicates at least one of the following information:

a value of $M_v$, or a range of the value of $M_v$;

whether the channel state information includes a reporting of the $M_v$ vectors; and whether the precoding matrix includes the second set of vectors.

In an embodiment, the precoding matrix indicator includes a coefficient of a vector constituting the precoding matrix, and a priority of the coefficient of the vector is determined according to at least one of the following:

the precoding matrix indicator includes a position of a vector in the second set of vectors corresponding to a strongest coefficient, where the priority of the coefficient of the vector is determined according to a relative position of a position of a vector in the second set of vectors corresponding to the coefficient of the vector to the position of the vector in the second set of vectors corresponding to the strongest coefficient;

the precoding matrix indicator includes a position of a vector in the first set of vectors corresponding to a strongest coefficient, where the priority of the coefficient of the vector is determined according to a relative position of a position of a vector in the first set of vectors corresponding to the coefficient of the vector to the position of the vector in the first set of vectors corresponding to the strongest coefficient;

the smaller an index number of a vector in the second set of vectors corresponding to the coefficient of the vector, the higher a priority of the coefficient of the vector, or the greater an index number of a vector in the second set of vectors corresponding to the coefficient of the vector, the lower a priority of the coefficient of the vector; and the precoding matrix indicator includes an indication of a strong polarization direction vector in the first set of vectors, where a priority of a coefficient of the strong polarization direction vector is higher than a priority of a coefficient of a corresponding weak polarization direction vector.

In an embodiment, whether to omit the coefficient of the vector is determined according to the priority of the coefficient, where the configuration information of the channel state information includes a number of coefficients retained in the channel state information after the omitting operation is performed; or, the configuration information of the channel state information includes a number of coefficients that should be omitted upon entering the omitting operation.

In an embodiment, whether to omit the coefficient of the vector is determined according to the priority of the coefficient, where the channel state information includes a number of coefficients retained in the channel state information after the omitting operation is performed; or, the channel state information includes a number of coefficients that should be omitted upon entering the omitting operation.

In an embodiment, a polarization direction where a strongest coefficient of a vector constituting the precoding matrix is located is a strong polarization direction, and another polarization direction is a weak polarization direction;

Herein, a non-zero coefficient $$c_i^{weak}$$

of a weak polarization direction corresponds to a non-zero coefficient $$c_i^{strong}$$

of a strong polarization direction;

A differential of an amplitude of a non-zero coefficient of the weak polarization direction with respect to an amplitude of a non-zero coefficient corresponding to the strong polarization direction is $$\left|C_i^{diff\_weak}\right|,$$

where $$\left|C_i^{weak}\right| = \left|C_i^{strong}\right| \cdot \left|C_i^{diff\_weak}\right|,$$

the precoding matrix indicator includes the differential $$\left|C_i^{diff\_weak}\right|$$

of the amplitude of the non-zero coefficient of the weak polarization direction with respect to the amplitude of the non-zero coefficient corresponding to the strong polarization direction; where i represents an index number of a coefficient, $$\left|C_i^{weak}\right|$$

represents the amplitude of the coefficient of the weak polarization direction, and $$\left|C_i^{strong}\right|$$

represents the amplitude of the coefficient of the strong polarization direction.

In an embodiment, the channel state information includes a number of coefficients that needs to be reported among coefficients of vectors constituting the precoding matrix, and whether to indicate a strongest coefficient is determined according to a number of coefficients that need to be reported.

In an embodiment, the channel state information includes a number of coefficients that needs to be reported among coefficients of vectors constituting the precoding matrix, and whether to indicate positions of the coefficients that need to be reported by the means of bit mapping is determined according to a number of the coefficients that need to be reported.

In an embodiment, whether to indicate the positions of the coefficients that need to be reported by the means of bit mapping is determined according to a ratio of a number of coefficients that needs to be reported to $LM_v$.

In an exemplary implementation, the present disclosure provides a channel state information transmission apparatus. FIG. 3 is a structural diagram of an information transmission apparatus provided by the embodiments of the present disclosure, and the apparatus may be configured at a first communication node. As shown in FIG. 3, the apparatus includes:

a first receiving module 31, configured to receive configuration information of a second communication node;

a second receiving module 32, configured to receive a channel state information reference signal sent by the second communication node, according to the configuration information; and a reporting module 33, configured to report channel state information according to the configuration information, where the channel state information is determined according to the channel state information reference signal;

where the configuration information includes configuration information of the channel state information.

The information transmission apparatus provided by the present embodiment is used to implement the channel state information transmission method in the embodiment as shown in FIG. 1, and an implementation principle and technical effect of the information transmission apparatus provided by the present embodiment are similar to the channel state information transmission method in the embodiment as shown in FIG. 1, which will not be repeated herein.

On the basis of the above embodiments, variant embodiments of the above embodiments are proposed, and it should be noted herein that, in order to simplify the description, only differences from the above embodiments are described in the variant embodiments.

In an embodiment, the channel state information includes a precoding matrix indicator, where a precoding matrix indicated by the precoding matrix indicator is determined by a first set of vectors, or determined by the first set of vectors and a second set of vectors; the first set of vectors includes L vectors, and the second set of vectors includes $M_v$ vectors, where L and $M_v$ are positive integers; where one vector in the first set of vectors corresponds to one port of the channel state information reference signal; one vector in the second set of vectors is a DFT vector with an index number of $$n_3^{(f)};$$

where an element of the DFT vector with the index number of $$n_3^{(f)}$$

is:

$$e^{j\frac{2\pi t n_3^{(f)}}{N_3}},$$

where $t=\{0, 1 \ldots, N_3-1\}$, $N_3$ is a number of the precoding matrix.

In an embodiment, the configuration information of the channel state information includes a reporting format of the precoding matrix indicator, where the reporting format of the precoding matrix indicator indicates at least one of the following information:

a value of $M_v$, or a range of the value of $M_v$;

whether the channel state information includes a reporting of the $M_v$ vectors; and whether the precoding matrix includes the second set of vectors.

In an embodiment, the precoding matrix indicator includes a coefficient of a vector constituting the precoding matrix, and a priority of the coefficient of the vector is determined according to at least one of the following:

the precoding matrix indicator includes a position of a vector in the second set of vectors corresponding to a strongest coefficient, where the priority of the coefficient of the vector is determined according to a relative position of a position of a vector in the second set of vectors corresponding to the coefficient of the vector to the position of the vector in the second set of vectors corresponding to the strongest coefficient;

the precoding matrix indicator includes a position of a vector in the first set of vectors corresponding to a strongest coefficient, where the priority of the coefficient of the vector is determined according to a relative position of a position of a vector in the first set of vectors corresponding to the coefficient of the vector to the position of the vector in the first set of vectors corresponding to the strongest coefficient;

the smaller an index number of a vector in the second set of vectors corresponding to the coefficient of the vector, the higher a priority of the coefficient of the vector, or the greater an index number of a vector in the second set of vectors corresponding to the coefficient of the vector, the lower a priority of the coefficient of the vector; and the precoding matrix indicator includes an indication of a strong polarization direction vector in the first set of vectors, where a priority of a coefficient of the strong polarization direction vector is higher than a priority of a coefficient of a corresponding weak polarization direction vector.

In an embodiment, whether to omit the coefficient of the vector is determined according to the priority of the coefficient, where the configuration information of the channel state information includes a number of coefficients retained in the channel state information after the omitting operation is performed; or, the configuration information of the channel state information includes a number of coefficients that should be omitted upon entering the omitting operation.

In an embodiment, whether to omit the coefficient of the vector is determined according to the priority of the coefficient, where the channel state information includes a number of coefficients retained in the channel state information after the omitting operation is performed; or, the channel state information includes a number of coefficients that should be omitted upon entering the omitting operation.

In an embodiment, a polarization direction where a strongest coefficient of a vector constituting the precoding matrix is located is a strong polarization direction, and another polarization direction is a weak polarization direction.

Herein, a non-zero coefficient $$C_i^{weak}$$

of a weak polarization direction corresponds to a non-zero coefficient $$C_i^{strong}$$

of a strong polarization direction.

A differential of an amplitude of a non-zero coefficient of the weak polarization direction with respect to an amplitude of a non-zero coefficient corresponding to the strong polarization direction is $$\left|C_i^{diff\_weak}\right|,$$

where $$\left|C_i^{weak}\right| = \left|C_i^{strong}\right| \cdot \left|C_i^{diff\_weak}\right|,$$

the precoding matrix indicator includes the differential $$\left|C_i^{diff\_weak}\right|$$

of the amplitude of the non-zero coefficient of the weak polarization direction with respect to the amplitude of the non-zero coefficient corresponding to the strong polarization direction; where i represents an index number of a coefficient, $$\left|C_i^{weak}\right|$$

represents the amplitude of the coefficient of the weak polarization direction, and $$\left|C_i^{strong}\right|$$

represents the amplitude of the coefficient of the strong polarization direction.

In an embodiment, the channel state information includes a number of coefficients that needs to be reported among coefficients of vectors constituting the precoding matrix, and whether to indicate a strongest coefficient is determined according to a number of the coefficients that need to be reported.

In an embodiment, the channel state information includes a number of coefficients that needs to be reported among coefficients of vectors constituting the precoding matrix, and whether to indicate positions of the coefficients that need to be reported by the means of bit mapping is determined according to a number of the coefficients that need to be reported.

In an embodiment, whether to indicate the positions of the coefficients that need to be reported by the means of bit mapping is determined according to a ratio of a number of coefficients that needs to be reported to $LM_v$.

Figure 4:
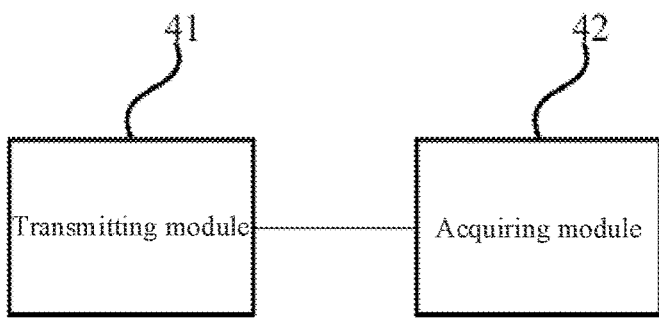
FIG. 4 is a structural diagram of a channel state information transmission apparatus provided by the embodiments of the present disclosure.

In an exemplary implementation, the present disclosure further provides a channel state information transmission apparatus. FIG. 4 is a structural diagram of an information transmission apparatus provided by the embodiments of the present disclosure, and the apparatus is configured at a second communication node. As shown in FIG. 4, the apparatus includes:

a transmitting module 41, configured to transmit configuration information;

an acquiring module 42, configured to acquire channel state information sent by a first communication node, where the channel state information is reported according to the configuration information;

where the configuration information includes configuration information of the channel state information.

The channel state information transmission apparatus provided by the present embodiment is used to implement the channel state information transmission method in the embodiment as shown in FIG. 2, and an implementation principle and technical effect of the channel state information transmission apparatus provided by the present embodiment are similar to the channel state information transmission method in the embodiment as shown in FIG. 2, which will not be repeated herein.

On the basis of the above embodiments, variant embodiments of the above embodiments are proposed, and it should be noted herein that, in order to simplify the description, only differences from the above embodiments are described in the variant embodiments.

In an embodiment, the channel state information includes a precoding matrix indicator, where a precoding matrix indicated by the precoding matrix indicator is determined by a first set of vectors, or determined by the first set of vectors and a second set of vectors; the first set of vectors includes L vectors, and the second set of vectors includes $M_v$ vectors, where L and $M_v$ are positive integers; where one vector in the first set of vectors corresponds to one port of the channel state information reference signal; one vector in the second set of vectors is a DFT vector with an index number of $$n_3^{(f)};$$

where an element of the DFT vector with the index number of $$n_3^{(f)}$$

is:

$$e^{j\frac{2\pi t n_3^{(f)}}{N_3}},$$

where t={0, 1 . . . , $N_3$−1}, $N_3$ is a number of the precoding matrix.

In an embodiment, the configuration information of the channel state information includes a reporting format of the precoding matrix indicator, where the reporting format of the precoding matrix indicator indicates at least one of the following information:

a value of $M_v$, or a range of the value of $M_v$;
whether the channel state information includes reporting of the $M_v$ vectors;
whether the precoding matrix includes the second set of vectors.

In an embodiment, the precoding matrix indicator includes a coefficient of a vector constituting the precoding matrix, and a priority of the coefficient of the vector is determined according to at least one of the following:

the precoding matrix indicator includes a position of a vector in the second set of vectors corresponding to a strongest coefficient, where the priority of the coefficient of the vector is determined according to a relative position of a position of a vector in the second set of vectors corresponding to the coefficient of the vector to the position of the vector in the second set of vectors corresponding to the strongest coefficient;

the precoding matrix indicator includes a position of a vector in the first set of vectors corresponding to a strongest coefficient, where the priority of the coefficient of the vector is determined according to a relative position of a position of a vector in the first set of vectors corresponding to the coefficient of the vector to the position of the vector in the first set of vectors corresponding to the strongest coefficient;

the smaller an index number of a vector in the second set of vectors corresponding to the coefficient of the vector, the higher the priority of the coefficient of the vector, or the greater an index number of a vector in the second set of vectors corresponding to the coefficient of the vector, the lower the priority of the coefficient of the vector; and the precoding matrix indicator includes an indication of a strong polarization direction vector in the first set of vectors, where a priority of a coefficient of the strong polarization direction vector is higher than a priority of a coefficient of a corresponding weak polarization direction vector.

In an embodiment, whether to omit the coefficient of the vector is determined according to the priority of the coefficient, where the configuration information of the channel state information includes a number of coefficients retained in the channel state information after the omitting operation is performed; or, the configuration information of the channel state information includes a number of coefficients that should be omitted upon entering the omitting operation.

In an embodiment, whether to omit the coefficient of the vector is determined according to the priority of the coefficient, where the channel state information includes a number of coefficients retained in the channel state information after the omitting operation is performed; or, the channel state information includes a number of coefficients that should be omitted upon entering the omitting operation.

In an embodiment, a polarization direction where a strongest coefficient of a vector constituting the precoding matrix is located is a strong polarization direction, and another polarization direction is a weak polarization direction.

Herein, a non-zero coefficient $$C_i^{weak}$$

of a weak polarization direction corresponds to a non-zero coefficient $$C_i^{strong}$$

of a strong polarization direction;

A differential of an amplitude of a non-zero coefficient of the weak polarization direction with respect to an amplitude of a non-zero coefficient corresponding to the strong polarization direction is $$\left|C_i^{diff\_weak}\right|,$$

where $$|C_i^{weak}| = |C_i^{strong}| \cdot |C_i^{diff\_weak}|,$$

the precoding matrix indicator includes the differential $$|C_i^{diff\_weak}|$$

of the amplitude of the non-zero coefficient of the weak polarization direction with respect to the amplitude of the non-zero coefficient corresponding to the strong polarization direction; where i represents an index number of a coefficient, $$|C_i^{weak}|$$

represents the amplitude of the coefficient of the weak polarization direction, and $$|C_i^{strong}|$$

represents the amplitude of the coefficient of the strong polarization direction.

In an embodiment, the channel state information includes a number of coefficients that needs to be reported among coefficients of vectors constituting the precoding matrix, and whether to indicate a strongest coefficient is determined according to a number of the coefficients that need to be reported.

In an embodiment, the channel state information includes a number of coefficients that needs to be reported among coefficients of vectors constituting the precoding matrix, and whether to indicate positions of the coefficients that need to be reported by the means of bit mapping is determined according to a number of the coefficients that need to be reported.

In an embodiment, whether to indicate the positions of the coefficients that need to be reported by the means of bit mapping is determined according to the ratio of a number of coefficients that needs to be reported to $LM_v$.

Figure 5:
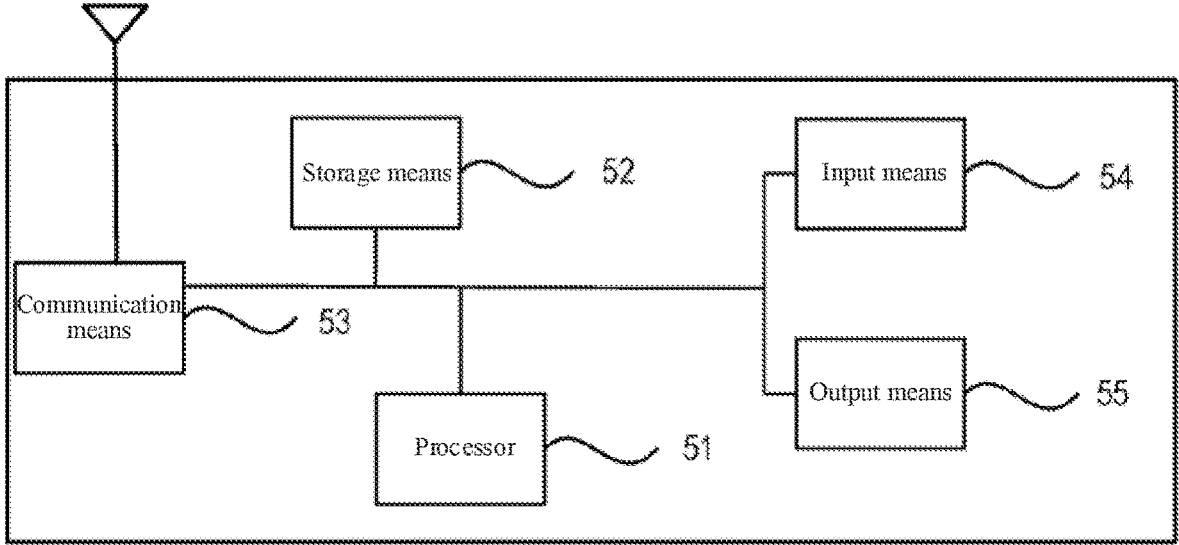
FIG. 5 is a structural diagram of a communication node provided by the embodiments of the present disclosure.

In an exemplary implementation, the present disclosure provides a communication node, and FIG. 5 is a structural diagram of a communication node provided by the embodiments of the present disclosure. In a case where the communication node implements the channel state information transmission method as shown in FIG. 1, the communication node is the first communication node; and in a case where the communication node implements the channel state information transmission method as shown in FIG. 2, the communication node is the second communication node. As shown in FIG. 5, the communication node provided by the present disclosure includes one or more processors 51 and a storage means 52; there may be one or more processors 51 in the communication node, and one processor 51 is taken as an example in FIG. 5; the storage means 52 is used to store one or more programs; the one or more programs, when executed by the one or more processors 51, cause the one or more processors 51 to implement the channel state information transmission method as described in the embodiments of the present disclosure.

The communication node further includes: a communication means 53, an input means 54 and an output means 55.

The processor 51, the storage means 52, the communication means 53, the input means 54 and the output means 55 in the communication node may be connected by a bus or in other ways, and the connection through the bus is taken as an example in FIG. 5.

The input means 54 may be used to receive an input digital or character information, and generate a key signal input related to a user setting and a function control of the communication node. The output means 55 may include a display means such as a display screen, etc.

The communication means 53 may include a receiver and a transmitter. The communication means 53 is configured to communicate information according to the control of the processor 51. The information includes, but is not limited to, the configuration information and the channel state information.

The storage means 52, as a computer-readable storage medium, may be configured to store a software program, a computer-executable program, and a module, such as a program instruction/module (for example, the first receiving module 31, the second receiving module 33, and the reporting module 33 in the channel state information transmission apparatus; for another example, the transmitting module 41 and the acquiring module 42 in the channel state information transmission apparatus) corresponding to the channel state information transmission method in the embodiments of the present disclosure. The storage means 52 may include a storage program area and a storage data area, where the storage program area may store an operating system, an application program required by at least one function; storage data area may store data created according to the usage of the communication node, etc. In addition, the storage means 52 may include a high-speed random access memory, and may also include a non-volatile memory, for example, at least one magnetic disk storage means, flash memory means, or other non-volatile solid state storage means. In some instances, the storage means 52 may further include memories located remotely with respect to the processor 51, and these remote memories may be connected to the communication node via the network. Instances of the above network include, but are not limited to, the Internet, intranet, local area network, mobile communication network, and a combination thereof.

The embodiments of the present disclosure also provide a storage medium, where the storage medium stores a computer program, and the computer program, upon being executed by a processor, implements any one of the methods in the present disclosure, and the storage medium stores a computer program, and the computer program, upon being executed by a processor, implements the channel state information transmission method of any one of the embodiments of the present disclosure, such as the channel state information transmission method applied to the first communication node and the channel state information transmission method applied to the second communication node, where the channel state information transmission method applied to the first communication node includes:

receiving configuration information of the second communication node;

receiving a channel state information reference signal sent by the second communication node, according to the configuration information; and reporting channel state information according to the configuration information, where the channel state information is determined according to the channel state information reference signal;

where the configuration information includes configuration information of the channel state information.

The channel state information transmission method applied to the second communication node includes:

transmitting configuration information;

acquiring channel state information sent by the first communication node, where the channel state information is reported according to the configuration information;

where the configuration information includes configuration information of the channel state information.

The computer storage medium in the embodiments of the present disclosure may adopt any combination of one or more computer readable media. The computer readable medium may be a computer readable signal medium or a computer readable storage medium. A computer readable storage medium may be, for example, but not limited to, an electrical, magnetic, optical, electromagnetic, infrared, or semiconductor system, apparatus or means, or any combination thereof. More specific examples (a non-exhaustive list) of a computer readable storage medium include: an electrical connection with one or more wires, a portable computer magnetic disk, a hard disk, a random access memory (RAM), a read only memory (ROM), an erasable programmable read only memory (EPROM), a flash memory, an optical fiber, a portable CD-ROM, an optical storage means, a magnetic storage means, or any suitable combination of the above. A computer readable storage medium may be any tangible medium that contains or stores a program which is used by or in combination with, an instruction executing system, apparatus, or means.

A computer readable signal medium may include a data signal, which is propagated in a baseband or as a part of a carrier wave, and in which a computer readable program code is carried. Such a propagated data signal may have many forms, including but not limited to: an electromagnetic signal, an optical signal, or any suitable combination of the above. A computer readable signal medium may also be any computer readable medium other than the computer readable storage medium, and the computer readable medium may send, propagate, or transmit the program which is used by or in combination with the instruction executing system, apparatus, or means.

A program code contained on the computer readable medium may be transmitted using any appropriate medium, including but not limited to: wireless, wire, optical cable, radio frequency (RF), etc., or any suitable combination of the above.

The computer program code for performing operations of the present disclosure may be written in one or more programming languages, or a combination thereof, including an object-oriented programming language—such as Java, Smalltalk, C++, and also including conventional procedural programming language—such as "C" language or a similar programming language. The program code may be executed entirely a user's computer, partly on the user's computer, as a stand-alone software package, partly on the user's computer and partly on a remote computer, or entirely on the remote computer or a server. In a case where the remote computer is involved, the remote computer may be connected to the user's computer by any kind of network, including a local area network (LAN) or a wide area network (WAN), or may be connected to an external computer (e.g., connected by the Internet using an Internet service provider).

The foregoing is only the exemplary embodiments of the present disclosure, and is not used to limit the protection scope of the present disclosure.

Those skilled in the art should understand that, the term "terminal" covers any suitable type of wireless user equipment, for example, a mobile phone, a portable data processing apparatus, a portable web browser or a vehicle-mounted mobile station.

In general, many embodiments of the present disclosure may be implemented in a hardware or an application specific circuit, a software, a logic or any combination thereof. For example, in some aspects, the embodiments may be implemented in the hardware, and in other aspects, the embodiments may be implemented in the hardware or the software which may be executed by a controller, a microprocessor or other computing apparatuses, although the present disclosure is not limited herein.

The embodiments of the present disclosure may be implemented by a data processor of a mobile apparatus (e.g., in a processor entity, or by the hardware, or by a combination of the software and the hardware) executing the computer program instruction. The computer program instructions may be assembly instructions, instruction set architecture (ISA) instructions, machine instructions, machine-related instructions, microcodes, firmware instructions, state setting data, or source codes or object codes written in any combination of one or more programming languages.

The block diagrams of any logic flow in the drawings of the present disclosure may represent program steps, or may represent the interconnected logic circuits, modules, and functions, or may represent a combination of program steps, and logic circuits, modules and functions. The computer program may be stored on the memory. The memory may be of any type suitable for the local technical environment and may be implemented by using any suitable data storage technology, for example, but is not limited to, a read-only memory (ROM), a random access memory (RAM), or an optical memory apparatus and system (Digital Video Disc (DVD) or Compact Disk (CD)), etc. The computer readable medium may include a non-transitory storage medium. The data processor may be of any type suitable for the local technical environment, for example, but not limited to, a general purpose computer, an application specific computer, a microprocessor, a digital signal processor (DSP), an application specific integrated circuit (ASIC), a field-programmable gate array (FPGA), and a processor based on a multi-core processor architecture.

What is claimed is:

1. A channel state information transmission method, applied to a first communication node, the method comprises:

receiving configuration information from a second communication node;

receiving a channel state information reference signal sent by the second communication node, according to the configuration information; and determining, channel state information according to the channel state information reference signal, wherein the channel state information comprises a precoding matrix indicator, wherein a precoding matrix indicated by the precoding matrix indicator is determined by a first set of vectors and a second set of vectors; the first set of vectors comprises L vectors, and the second set of vectors comprises $M_v$ vectors, wherein the L and the $M_v$ are positive integers; wherein one vector in the first set of vectors corresponds to one port of the channel state information reference signal; one vector in the second set of vectors is a discrete fourier transform (DFT) vector with an index number of $$n_3^{(f)};$$

wherein an element of the DFT vector with the index number of $$n_3^{(f)}$$

is:

$$e^{j\frac{2\pi t n_3^{(f)}}{N_3}},$$

wherein t={0,1 ..., $N_3$−1}, $N_3$ is a number of the precoding matrix, wherein the channel state information comprises a number of coefficients that need to be reported among coefficients of vectors constituting the precoding matrix;

determining, whether to indicate positions of the coefficients that need to be reported by means of bit mapping according to a number of layers r of precoding, a number of the first set of vectors L and a number of the second set of vectors $M_v$;

reporting the channel state information according to the configuration information.

2. The method according to claim 1, wherein the precoding matrix indicator comprises a coefficient of a vector constituting the precoding matrix, and a priority of the coefficient of the vector is determined according to:

the smaller an index number of a vector in the second set of vectors corresponding to the coefficient of the vector, the higher the priority of the coefficient of the vector.

3. A non-transitory storage medium with a computer program stored thereon, the computer program, upon being executed by a processor, implements the method of claim 1.

4. A channel state information transmission method, applied to a second communication node, the method comprises:

transmitting configuration information to a first communication node;

transmitting a channel state information reference signal to the first communication node; and acquiring channel state information sent by the first communication node, wherein the channel state information is reported according to the configuration information, wherein the channel state information comprises a precoding matrix indicator, wherein a precoding matrix indicated by the precoding matrix indicator is determined by a first set of vectors and a second set of vectors; the first group of vectors comprises L vectors, and the second group of vectors comprises $M_v$ vectors, wherein the L and the $M_v$ are positive integers; wherein one vector in the first set of vectors corresponds to one port of the channel state information reference signal; one vector in the second set of vectors is a discrete fourier transform (DFT) vector with an index number of $$n_3^{(f)};$$

wherein an element of the DFT vector with the index nuber of $$n_3^{(f)}$$

is $$e^{j\frac{2\pi t n_3^{(f)}}{N_3}},$$

wherein t={0,1 . . . $N_3$−1}, $N_3$ is a number of the precoding matrix, wherein the channel state information comprises a number of coefficients that need to be reported among coefficients of vectors constituting the precoding matrix;

wherein whether to indicate positions of the coefficients that need to be reported is determined by means of bit mapping according to a number of layers r of precoding, a number of the first set of vectors L and a number of the second set of vectors $M_v$.

5. The method according to claim 4, wherein the precoding matrix indicator comprises a coefficient of a vector constituting the precoding matrix, and a priority of the coefficient of the vector is determined according to:

the smaller an index number of a vector in the second set of vectors corresponding to the coefficient of the vector, the higher the priority of the coefficient of the vector.

6. A communication node, comprising:

one or more processors; and a storage means, configured to store one or more programs;

wherein the one or more programs, upon being executed by the one or more processors, cause the one or more processors to implement the following operations of:

receiving configuration information from a second communication node;

receiving a channel state information reference signal sent by the second communication node, according to the configuration information; and determining, channel state information according to the channel state information reference signal, wherein the channel state information comprises a precoding matrix indicator, wherein a precoding matrix indicated by the precoding matrix indicator is determined by a first set of vectors and a second set of vectors; the first set of vectors comprises L vectors, and the second set of vectors comprises $M_v$ vectors, wherein the L and the $M_v$ are positive integers; wherein one vector in the first set of vectors corresponds to one port of the channel state information reference signal; one vector in the second set of vectors is a discrete fourier transform (DFT) vector with an index number of $$n_3^{(f)};$$

wherein an element of the DFT vector with the index number of $$n_3^{(f)}$$

is:

$$e^{j\frac{2\pi t n_3^{(f)}}{N_3}},$$

wherein t={0,1 . . . , $N_3$−1}, $N_3$ is a number of the precoding matrix, wherein the channel state information comprises a number of coefficients that need to be reported among coefficients of vectors constituting the precoding matrix;

determining, whether to indicate positions of the coefficients that need to be reported by means of bit mapping according to a number of layers r of precoding, a number of the first set of vectors L and a number of the second set of vectors $M_v$;

reporting the channel state information according to the configuration information.

7. The communication node according to claim 6, wherein the precoding matrix indicator comprises a coefficient of a vector constituting the precoding matrix, and a priority of the coefficient of the vector is determined according to:

the smaller an index number of a vector in the second set of vectors corresponding to the coefficient of the vector, the higher the priority of the coefficient of the vector.

8. A second communication node, comprising:

one or more processors; and a storage means, configured to store the one or more programs;

wherein the one or more programs, upon being executed by the one or more processors, cause the one or more processors to implement the following operations of:

transmitting configuration information to a first communication node;

transmitting a channel state information reference signal to the first communication node; and acquiring channel state information sent by the first communication node, wherein the channel state information is reported according to the configuration information, wherein the channel state information comprises a precoding matrix indicator, wherein a precoding matrix indicated by the precoding matrix indicator is determined by a first set of vectors and a second set of vectors; the first group of vectors comprises L vectors, and the second group of vectors comprises My vectors, wherein the L and the My are positive integers; wherein one vector in the first set of vectors corresponds to one port of the channel state information reference signal; one vector in the second set of vectors is a discrete fourier transform (DFT) vector with an index number of $$n_3^{(f)};$$

wherein an element of the DFT vector with the index number of $$n_3^{(f)}$$

is $$e^{j\frac{2\pi t n_3^{(f)}}{N_3}},$$

wherein t={0,1 . . . , $N_3$−1}, $N_3$ is a number of the precoding matrix, wherein the channel state information comprises a number of coefficients that need to be reported among coefficients of vectors constituting the precoding matrix;

wherein whether to indicate positions of the coefficients that need to be reported is determined by means of bit mapping according to a number of layers r of precoding, a number of the first set of vectors L and a number of the second set of vectors $M_v$.

* * * * *